United States Patent [19]

Patzschke et al.

[11] Patent Number: 5,021,502

[45] Date of Patent: Jun. 4, 1991

[54] AQUEOUS ELECTRODEPOSITION LACQUER COATING COMPOSITION

[75] Inventors: Hans-Peter Patzschke; Peter W. Cerny; Dietrich Saatweber, all of Wuppertal; Georg H. L. Hendrikx, Velbert, all of Fed. Rep. of Germany

[73] Assignee: Herberts Gesellschaft mit beschränkter Haftung, Wuppertal, Fed. Rep. of Germany

[21] Appl. No.: 463,902

[22] Filed: Jan. 10, 1990

Related U.S. Application Data

[63] Continuation of Ser. No. 89,933, Aug. 25, 1987, abandoned, which is a continuation of Ser. No. 783,831, Oct. 3, 1985, abandoned.

[30] Foreign Application Priority Data

Oct. 4, 1984 [DE] Fed. Rep. of Germany ........... 34345

[51] Int. Cl.$^5$ .............................................. C08G 18/00
[52] U.S. Cl. .................................. 524/591; 524/901; 528/45
[58] Field of Search ................................ 524/901, 591

[56] References Cited

U.S. PATENT DOCUMENTS 3,523,925 8/1970 Kamal et al. ........................... 528/44

Primary Examiner—Paul R. Michl
Assistant Examiner—P. Niland
Attorney, Agent, or Firm—Schweitzer, Cornman & Gross

[57] ABSTRACT

An aqueous electrodeposition lacquer coating composition containing as binder
(A) from 95 to 50% by weight of an organic externally crosslinkable synthetic resin binder containing primary and/or secondary hydroxyl groups and primary, secondary and/or tertiary amino groups and
(B) from 5 to 50% by weight of a crosslinking agent mixture of
(a) blocked isocyanates and
(b) transesterifiable crosslinking agents containing more than two ester groups and
(c) optionally up to 30% by weight of hydroxyfunctional resins.

The invention also relates to the use of this electrodeposition coating composition for coating objects, particularly objects having electrically conductive surfaces.

6 Claims, No Drawings

AQUEOUS ELECTRODEPOSITION LACQUER COATING COMPOSITION

This is a continuing application of U.S. Ser. No. 089,933, filed on Aug. 25, 1987, which is a continuing application of U.S. Ser. No. 783,831, filed on Oct. 3, 1985, both now abandoned.

BACKGROUND OF THE INVENTION

This invention relates to a preferably cathodically depositable aqueous electrodeposition lacquer coating composition containing an organic synthetic resin binder which is dilutable with water by protonization with acids and which contains an organic amine-containing synthetic resin component and crosslinking agents; and thermal crosslinking catalysts and, optionally, pigments, fillers, corrosion inhibitors, standard lacquer auxiliaries and, in a quantity of up to 20% by weight, based on the total weight of the coating composition, of organic solvents. The invention also relates to the use of this coating composition for coating objects having an electrically conductive surface. These objects are immersed in the bath of the electrodeposition lacquer coating composition and, in an electrical field, the coating composition is deposited on the object to be coated serving as cathode.

Electrodeposition lacquer coating compositions of the type in question are used on an industrial scale. They are also known as electrophoresis lacquers or EC lacquers. At the present time, aminoepoxy resins produced from epoxy resins based on bisphenol A and amines and/or aminoalcohols are used in practice as high-coverage EC lacquers affording effective protection against corrosion.

These binders are thermally crosslinked by various methods, for example by reactions with blocked polyisocyanates (DE-A-20 57 799, DE-A-21 31 060, DE-A-22 52 536, DE-A-22 65 195, DE-A-23 63 074, DE-A-26 34 211) or by addition of transesterifiable crosslinking agents (EP-A-0 004 090, EP-A-0 012 463, EP-A-0 040 867, EP-A-0 066 859, EP-A-0 082 291, DE-A-31 03 642, DE-A-32 24 864, DE-A-33 15 469). The properties of the lacquer are not satisfactory in every respect, depending on customer requirements. Resin systems containing blocked polyisocyanates are generally attended by the disadvantage of high stoving losses at the high hardening temperatures necessary, thereby polluting the environment. Low molecular weight alcohols, such as methanol or ethanol, cannot be used as blocking agents because their urethanes are stable at temperatures below about 250° C. Resins crosslinked by transesterification show inadequate adhesion and poor resistance to detergents coupled with serious bubble formation.

In the production of color-stable two-coat lacquers of the type applied to domestic appliances, both systems have the unpleasant property of yellowing to a considerable extent under the effect of cracking products emanating from the primer during stoving of the surface lacquer at elevated stoving temperatures. In some cases, cloud-like changes in color are even produced in the surface lacquer, spoiling the optimal appearance thereof. Other state-of-the-art binder systems based on aminopoly(meth)acrylate resin or aminopolyurethane resin, which do not yellow to the same extent, have so far failed to show the high corrosion inhibition level achieved by aminoepoxy resins in the automotive industry It is not possible with the priming systems hitherto used, on account of their properties, to achieve good two-coat lacquering for this particular application without the filler.

SUMMARY OF THE INVENTION

The object of the present invention is to provide cathodically depositable aqueous electrodeposition lacquer coating compositions which show improvements over known coating compositions in regard to the disadvantages described above.

It has now surprisingly been found that this object be achieved by using as crosslinking agents not only blocked polyisocyanates or transesterifiable crosslinking agents, but also mixtures of these two crosslinking agents in certain ratios.

Accordingly, the present invention relates to cathodically depositable, aqueous electrodeposition lacquer coating compositions and to their use for coating objects having electrically conductive surfaces as defined in the claims.

DETAILED DESCRIPTION OF THE INVENTION

The base resin or component (A) of the binder mixture may be any of the synthetic resin binders containing primary and/or secondary hydroxyl groups and primary, secondary and/or tertiary amino groups commonly used in this field, such as aminoepoxy resins, aminopoly(meth)acrylate resins and/or aminopolyurethane resins having a hydroxyl number of from 50 to 500 (mg KOH/g solid resin), an amine number of from 30 to 150 (mg KOH/g solid resin) and an average molecular weight ($\overline{M}n$) of from 250 to 10,000. It is preferred to use aminoepoxy resins for primers affording effective protection against corrosion.

The synthetic resin binder (A) contains at least one amino group per molecule The lower limit to the amine number should be preferably 45 and, more preferably, 70, whilst the upper limit should preferably be at 120 and more preferably at 100. If the amine number is too low, solubility is inadequate or excessively acidic pH-values are established in the deposition baths through an excessive degree of neutralization. If the amine number is too high, the film formed during deposition shows poor adhesion or a blistered surface.

Examples of aminoepoxy resins are reaction products of epoxy-group-containing resins preferably containing terminal epoxy groups from the group comprising polyglycidylethers, polyglycidylesters, polyglycidylamines and polyglycidyl(meth)-acrylates containing saturated and/or unsaturated secondary and/or primary amines or aminoalcohols. They may be modified at the alkyl group by at least one primary and/or secondary hydroxyl group, by the dialkylamino group and/or by a primary amino group which is temporarily protected by ketimine formation.

Aminoepoxy resins containing hydroxyl groups are best obtained from polyglycidylethers containing at least one and preferably two 1,2-epoxy groups per molecule. In the context of the invention, polyglycidylethers are preferably understood to be polyglycidylethers corresponding to the following general formula

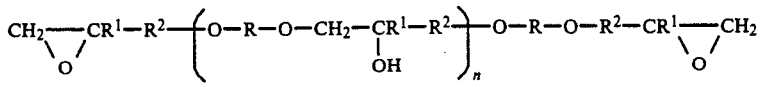

with

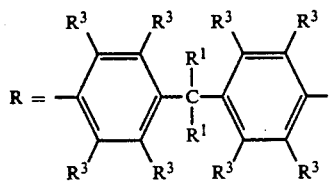

$R^1 = -H$ and/or $-C_mH_{2m+1}$,
$R^2 = -(CR^1_2)_m-$, preferably $-CH_2-$,
$R^3 = -R^1$, halogen or preferably $-H$,
$n = 0$ to $8$, preferably $1$ to $6$,
$m = 1$ to $8$, preferably $1$.

These polyglycidylethers have an average molecular weight ($\overline{M}n$) of from about 300 to 5000 and an epoxy equivalent weight of from about 170 to 2500. Resins such as these are reaction products of epichlorohydrin with dihydroxydiphenylmethane (bisphenol F) or dihydroxydiphenylpropane (bisphenol A) and also dihydroxybenzophenone or dihydroxynapthalene. Polyepoxides of suitable molecular weight are obtained either by suitably selecting the molar ratios of bisphenol to epichlorohydrin or by reaction of the monomeric diglycidyl compound with more bisphenol.

The epoxy resins may be completely or partly hydrogenated or may be used in mixtures of different structure and molecular weight. Thus, for elasticization, part of the described polyglycidylether is replaced by aliphatic polyglycidylethers corresponding to the following formula

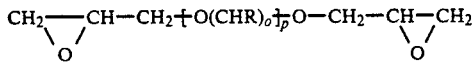

in which $R = H$ or a lower alkyl group optionally substituted by various substituents and $o = 2$ to $6$ and $p = 5$ to $50$. Examples are polypropylene glycol or polybutylene glycol of varying molecular weight. The modified epoxy resins may also be reacted by reaction with long-chain polyalcohols, such as 1,6-hexane diol, neopentyl glycol, bis-ethoxylated neopentyl glycol, hydroxypivalic acid neopentyl glycol ester and bis- (hydroxymethyl)-cyclohexane, monoanhydropentaerythritol and also polytetrahydrofuran diol, polycaprolactone diol, polycaptolactam diol or polybutadiene diol in the presence of suitable basic or acidic catalysts, such as boron fluorideamine complexes. Whereas polyalcohols containing primary OH groups may be directly reacted with polyglycidylethers using suitable catalysts, secondary OH groups are initially reacted with diisocyanate. The NCO-terminated reaction product obtained may then be incorporated without difficulty as a bridge between two moles of polyglycidylether with an increase in molecular weight and in functionality.

To reduce the amine number, the aminoepoxy resin may also be modified with saturated or unsaturated polycarboxylic acids and/or hydroxycarboxylic acids. Aliphatic, cycloaliphatic and/or aromatic polycarboxylic acids of varying chain length are, for example, adipic acid, sebacic acid, fumaric acid, isophthalic acid or dimeric fatty acid. Hydroxyalkylcarboxylic acids are understood to be lactic acid, dimethylolpropionic acid or even polyesters containing carboxyl and hydroxyl groups. Where excess polyglycidylether of low molecular weight is reacted with polycarboxylic acids and/or polyalcohols, modified polyglycidylethers are obtained as intermediate stage and are then further reacted with amines and/or aminoalcohols.

It is also possible to use heterocyclic polyepoxide compounds, such as 1,3-diglycidyl-5,5-dimethyl hydantoin, triglycidylisocyanurate or diepoxides of bisimides. Another suitable class of polyepoxides are polyglycidylethers of phenolic novolak resins, in which case functionality may be increased from 2 to approximately 6 glycidyl groups per molecule. Elasticizing elements may be additionally incorporated by defunctionalization with long-chain alkylphenols, such as dodecylphenol. Polyglycidylesters of polycarboxylic acids, such as hexahydrophthalic acid diglycidylester, tetrahydrophthalic acid diglycidylester or fumaric acid diglycidylester, may also be used with advantage.

The amino groups are introduced either by addition of NH-reactive compounds onto the epoxy group or by reaction of the hydroxyl groups in the base resin with basic monoisocyanates obtained by reaction of aromatic and/or aliphatic and/or cycloaliphatic di- or polyisocyanates with dialkylaminoalkanol (cf. DE-A-27 07 405).

The NH-reactive compounds used are primary monoalkylamines, such as dialkylaminoalkylamine, and/or preferably secondary monoamines, such as dialkylamines, monoalkylhydroxyalkylamines or dihydroxyalkylamines. Examples of suitable compounds are diethylamine, dimethylaminopropylamine, N-methylaminoethanol or diethanolamine. Where primary amines, such as octylamine, monoethanolamine, dimethylaminopropylamine, diethylaminoethylamine, dimethylaminoneopentylamine or methoxypropylamine, are used, the amine containing the epoxy group reacts with 1 to 2 epoxy groups with enlargement of the molecule, depending on the stoichiometric ratios involved. With secondary diamines, chain extension occurs. The secondary diamines, preferably long-chain diamines, used are N,N'-dialkyldiaminoalkanes or reaction products of saturated glycidylethers or glycidylesters with primary diaminoalkanes, such as the addition product of 1,6-hexane diamine with 2 moles of the glycidylester of Versatic acid ®. The suitable number of hydroxyl groups on the one hand is formed automatically from the epoxy group during addition of the secondary amino groups and, on the other hand, may be controlled by using hydroxyalkylamines.

The molar ratios between the compounds containing epoxy groups and the compounds containing amino groups should be selected in such a way that complete incorporation of the amine is guaranteed, because rupture-like surface defects can occur during electrophoretic deposition, i.e. a slight excess of epoxy groups is of advantage.

It is possible to react all the amines in admixture with the epoxy groups or to work in stages, i.e. one or more basic intermediate products containing epoxy groups may be produced in a varying sequence The reaction of the amines begins at temperatures as low as room temperature and is generally exothermic. In order to obtain a complete reaction, it is generally necessary to increase the temperature temporarily to around 50° to 120° C. Before addition of the amine, the resin containing 1,2-epoxy groups is dissolved in organic solvents, such as xylene, methylisobutylketone, which have to be subsequently distilled off before dilution, or in solvents such as ethylene glycol monoethylether, propylene glycol monoethylether, diethylene glycol dimethylether or diacetone alcohol, which may remain in solution. In order to remove excess amine, a thin-layer evaporator or steam distillation is optionally used.

The aminoepoxy resin of component (A) may be modified to obtain optimal technical properties by using corresponding saturated or unsaturated compounds. Unsaturated double bonds are introduced either directly by addition onto the epoxy groups or indirectly by reaction of the hydroxyl groups of the base resin with unsaturated monoisocyanates of the type obtained by reaction of aromatic and/or aliphatic and/or cycloaliphatic di- or polyisocyanates with $\alpha,\beta$-unsaturated monocarboxylic acids or corresponding carboxylic acid amides and also hydroxyalkyl(meth)acrylates or dicarboxylic acid esters of unsaturated alcohols, such as allylalcohol or hydroxyalkyl(meth)acrylates, and described in DE-A-27 07 482. The compounds selected are compounds which give thermally stable urethane groups by virtue of their structure in the molecular arrangement. Direct addition onto the epoxy group may be carried out, for example, with diallylamine, unsaturated fatty amines or even unsaturated fatty acids. Unsaturated groups may even be incorporated through the chain-extending agent. Thus, unsaturated monoepoxides are added onto di- or polyamines containing at least two primary amino groups or at least one primary and one secondary amino group, such as 1,6-hexane diamine, 3-aminomethylaminopropylamine, diethylene triamine, trimethylhexamethylene diamine and isophorone diamine, in accordance with the following formula:

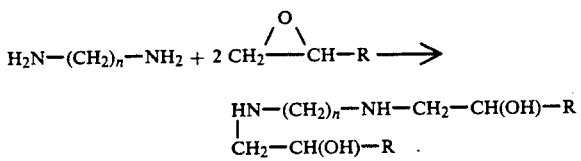

in which
R=—CH$_2$—O—CH$_2$—CH=CH$_2$,

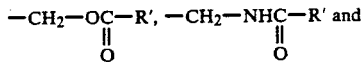

R' represents an unsaturated hydrocarbon residue of monocarboxylic acids.

The following unsaturated monoepoxy compounds may be used, as described in DE-A-31 22 641:
a) glycidylesters of linear or branched, isolated or conjugated unsaturated C$_3$–C$_{18}$ monocarboxylic acids,
b) glycidylethers of linear or branched, isolated or conjugated unsaturated C$_3$–C$_{18}$ monoalcohols According to DE-A-33 36 749, significant improvements in properties are obtained if aminoepoxy resin molecules have incorporated therein at least one molecule-enlarging diamine corresponding to the following formula

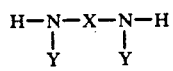

in which Y represents —H or C$_m$H$_{2m+1}$ (m=1 to 8) or an organic residue which is used for defunctionalization and which is formed by reaction of the primary amino group with monoepoxides, and X represents a molecule group containing at least one amide, urea and/or urethane group, these groups being attached to the nitrogen atoms of formula (I) through C$_2$–C$_{16}$ alkylene groups.

A diamine containing amide groups is obtained by condensation of aminocarboxylic acid with a primary diamine or of 1 mole of dicarboxylic acid with 2 moles of diamine. A diamine containing urea groups is obtained by addition of diaminoalkanes onto polyisocyanates containing at least two isocyanate groups. Thus, 2 moles of primary or secondary diamine or 1 mole of primary or secondary monoamine and 1 mole of primary diamine may be reacted with 1 mole of diisocyanate.

According to the invention, however, hydroxyl groups must always be present for the different crosslinking reactions. The hydroxyl number in the molecule (expressed in mg KOH/g solid resin) determines the crosslinkability of the film. It should be above 50, preferably above 100 and more preferably above 150. The upper limit to the hydroxyl number is at 400, but preferably below 300. If the hydroxyl number is too low, films that are still soluble in organic solvents, such as methylethylketone, are formed during the transesterification. By contrast, if the hydroxyl number is too high, the film becomes excessively brittle and may even remain too hydrophilic. At least two crosslinkable, preferably primary hydroxyl groups must be present in the molecule.

The primary and/or secondary hydroxyl groups important to the crosslinking process may be partly replaced by primary and/or secondary amino groups. Primary amino groups are introduced into the resin base preferably by reaction of resins containing at least one and preferably at least two epoxy groups per molecule with a ketimine and/or aldimine and/or polyamine containing amino and/or hydroxyl groups. The preferred ketimines are reaction products of ketones and alkylamines containing secondary amino groups, such as methylisobutylketone and diethylene triamine.

The ketimines are obtained in known manner by elimination of water from the corresponding polyamines of the general formula R—NH—R—NH$_2$ or from the corresponding aminoalcohols of the general formula HO—R—NH$_2$ and suitable aliphatic ketones, such as diethylketone, methylisobutylketone, ethyl- n-propylketone or from cyclopentanone, cyclohexanone, acetophenone, etc. The reaction conditions (reaction temperature, solvent) should be controlled in such a way that no substances which break the ketimine bond, such as water, remain in the reaction product.

The ketimine protects the primary amino group (cf. U.S. Pat. No. 3,523,925) in such a way that it may readily be reacted with the base epoxy resin through another functional group, for example a hydroxyl group or preferably a secondary amino group. It is important to ensure, by suitably selecting the molar ratios between the components used, that no unreacted low molecular weight amine remains behind in the batch because otherwise rupture-like surface defects occur during the electrophoretic deposition process. The reaction of the secondary amino group of the polyaminoketimine with the epoxy group begins at temperatures as low as room temperature and is generally exothermic In order to obtain a complete reaction, it is generally necessary to increase the temperature temporarily to between 50° and 120° C.

Aminopoly (meth)acrylate resins are produced by known methods, as described in DE-A-15 46 854 or in DE-A-23 25 177, for example from mixtures of different unsaturated monomers, such as (meth)acrylates, vinyl-(alkyl)benzenes, hydroxyalkyl(meth)acrylates or hydroxyalkyl(meth)acrylamides, and other unsaturated monomers which either contain basic nitrogen atoms or into which a basic nitrogen atom may be introduced by chemical reaction The unsaturated N-group-containing monomers used are, for example, N-dialkyl- or N-monoalkylaminoalkyl(meth)acrylates, N-dialkyl- or N-monoalkyl-aminoalkyl(meth)acrylamides or heterocyclic compounds containing vinyl groups and one or more basic nitrogen atoms.

In another preferred process, monoethylenically unsaturated monomers containing epoxy groups are incorporated in the copolymer, followed by reaction with excess primary and/or secondary monoamines and/or monoaminoalcohols. The excess amine is then distilled off. This process is described in detail in German Patent Application P 34 36 346.7-44 (DE-A-34 36 346) filed on Oct. 4th, 1984 under the title "An externally crosslinked aminopoly(meth)acrylateresin free from epoxy groups, a process for its production, its use, a CED bath containing it and its use for coating objects".

Suitable monomers containing epoxy groups are glycidyl esters of (meth)acrylic acid, maleic acid and/or fumaric acid, glycidylethers of unsaturated alcohols, such as vinyl and/or allyl alcohol, glycidyl compounds of (meth)acrylamide, maleic and/or fumaric acid diamide or maleic imide. Particularly suitable secondary amines for this reaction correspond to the following formula

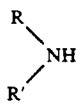

in which
R=—H, —CH$_3$ or —C$_2$H$_5$,
R''=—C$_n$H$_{2n+1}$ or —C$_n$H$_{2n}$OH
and
n=1 to 3.

Readily soluble ED baths of high pH value are obtained by using dimethylamine, diethylamine, methylethylamine or N-methylaminoethanol.

The aminopoly(meth)acrylate resins contain at least one amino group, preferably a tertiary amino group, per molecule and at least one hydroxyl groups and preferably at least two hydroxyl groups per molecule for an average molecular weight ($\overline{Mn}$) of from 600 to 10,000.

Aminopolyurethane or urea resins which, in addition to hydroxyl groups, contain tertiary amino groups are described, for example, in DE-A-33 33 834. They are produced from polyisocyanates containing at least two NCO groups per molecule which are reacted with polyalcohols, polyamines and/or aminopolyalcohols. Aliphatic, cycloaliphatic and/or aromatic polyisocyanates and their isocyanate-group-containing modifications, of the type also discussed hereinafter with reference to the production of crosslinking agents, are used. The compounds containing hydroxyl groups are used in such an excess, based on the NCO group, that the end product has a hydroxyl number of from 50 to 400. They are used on the one hand for introducing crosslinkable groups and on the other hand for molecule enlargement. Examples are neopentyl glycol, trimethylol propane, glycerol, pentaerythritol or relatively high molecular weight polyols, such as polyethers, polyesters and/or polycaprolactone polyols. Enlargement of the molecule may also be achieved with primary and/or secondary N,N'-diaminoalkanes or primary N-aminoalkanols or N-alkylaminoalkanols, such as 1,6-hexane diamine, ethanolamine or N-methylethanolamine. Tertiary amino groups are used for introducing the amino groups, being reacted with the isocyanate groups either through Zerewitinoff-reactive amino groups additionally present or through hydroxyl groups. Examples are N,N-dimethylaminoethanol, N-methyldiethanolamine, triethanolamine, N,N-diethylaminoethylamine or N,N-dimethylaminopropylamine. Aminopolyurethane or urea resins contain at least one amino group, preferably a tertiary amino group, and at least two hydroxyl groups per molecule for an average molecular weight ($\overline{Mn}$) of from about 500 to 20,000 and more especially from 1000 to 5000. The individual components may be reacted in admixture with the polyisocyanate or may even be produced in stages in any sequence through one or more intermediate products still containing isocyanate groups. An intermediate product containing tertiary amino groups and NCO groups is preferably reacted in a second reaction step with such an excess of polyhydroxyl compounds that all the NCO groups are reacted and the desired hydroxyl number is obtained.

The externally crosslinkable synthetic resin binders (A) containing amino groups described in the foregoing are used together with crosslinking agent mixtures which are referred to hereinafter as component (B). In accordance with the prior art, from 50 to 5% by weight of crosslinking agent, based on solid resin, is used to 50 to 95% by weight of synthetic resin binder (A). Components (A) and (B) are preferably mixed in a ratio of from 90:10 to 60:40, this mixing ratio being empirically determined from the optimal performance properties attainable at the particular stoving temperature. Special properties which had not been expected from the individual components are surprisingly obtained by using mixtures of blocked polyisocyanates and resins containing esterifiable ester groups in a mixing ratio of from 1:20 to 20:1. It is best to use a mixture of from 5 to 95% by weight of blocked polyisocyanate with from 95 to 5% by weight of transesterifiable crosslinking agent, based on the sum of the crosslinking agents as solid resin. The mixing ratio of blocked polyisocyanate to transesterifiable crosslinking agent is advantageously from 1:4 to 4:1 and better still from 1:2 to 2:1. The crosslinking agent best has an average molecular weight ($\overline{Mn}$) of from about 250 to 5000 and more especially from 500 to 3000.

The blocked polyisocyanates are prepared by reacting a multifunctional isocyanate with an at least stoichiometric quantity of a monofunctional compound containing active hydrogen (Zerewitinoff reaction), optionally in the presence of basic catalysts, such as tertiary amines or metal salts, such as dibutyl tin dilaurate or tin octoate. The reaction product obtained reacts on heating with the hydroxyl groups of the synthetic resin binder (A), the protective group being split off again. Suitable protective groups are those which are split off at stoving temperatures below 210° C., preferably below 190° C. and more preferably below 180° C. and above 110° C., preferably above 140° C. and more preferably above 150° C. Blocking agents for the isocyanates contain only a single amine, amide, lactam, thiol or hydroxyl group. Thus, suitable blocking agents are, for example, aliphatic or cycloaliphatic alcohols, such as 2-ethylhexanol, dialkylaminoalcohols, such as dimethylaminoethanol, phenols, such as cresol, oximes, such as methylethylketoxime, lactams, such as ε-caprolactam, imides, such as phthalimide, malonic acid or acetoacetic acid ester.

Typical multifunctional isocyanates which may be used in accordance with the invention are aliphatic, cycloaliphatic and/or aromatic polyisocyanates containing at least two isocyanate groups per molecule Examples are the isomers or isomer mixtures of tolylene diisocyanate, tolylene triisocyanate, 4,4′-diphenylmethane diisocyanate, diphenyltetraisocyanate and/or naphthyltetraisocyanate and also hydrogenation products thereof, such as dicyclohexylmethane diisocyanate. Preferred aliphatic diisocyanates are compounds corresponding to the following formula

in which r is an integer of from 3 to 12, more especially from 6 to 8, and R, which may be the same or different, represents hydrogen or a lower alkyl group containing from 1 to 8 carbon atoms, preferably 1 or 2 carbon atoms. Examples are hexamethylene diisocyanate, 1,6-diisocyanato-2,2,4-trimethylhexane, isophorone diisocyanate.

Mixed aliphatic/aromatic compounds are also suitable. Suitable triisocyanates are the products obtained by trimerization or oligomerization from diisocyanates or polyisocyanates and polyfunctional compounds containing OH or NH groups. Products such as these include, for example, the biuret of hexamethylene diisocyanate and water, the isocyanurate of hexamethylene diisocyanate or the adduct of tolylene diisocyanate with trimethylol propane. Enlargement of the molecule may also be achieved by reaction with polyalcohols containing tertiary amino groups, such as N-methyldiethanolamine, triethanolamine or polyamines containing tertiary amino groups, such as 3-(methyl)-3-(2-aminoethyl)-aminopropylamine. In addition, chain-terminating N-dialkylaminoalcohols, such as dimethylaminoethanol, or N,N-dialkylalkylene diamines, such as dimethylaminopropylamine or N,N-diethyl-N′-methyl-1,3e-thane diamine, may be used to improve solubility. Isocyanate containing prepolymers based on polyglycolethers, polyester polyols, polyether polyols, polycaprolactone polyols and/or polycaprolactam polyols, may also be used with advantage. Vinyl polymers which, in addition to isocyanate groups, for example from cyanatoethyl(meth)acrylate, also contain alkyl(meth)acrylates and/or (alkyl)vinylbenzenes as co-monomers, may also be used. In order to produce substantially non-yellowing lacquers, aliphatic and cycloaliphatic polyisocyanates are preferred.

Resins containing transesterifiable ester groups contain terminal or lateral esterified carboxyl groups which are largely stable in neutral, aqueous medium, but which react with synthetic resin binders containing one or more hydroxyl and/or amino groups (component A) in the basic medium of the deposited film at temperatures above about 140° C. In this reaction, the transesterifiable ester groups are transesterified or transamidated with the hydroxyl groups or with the reactive NH groups of the synthetic resin binder (A) with elimination of the more readily volatile "alcoholic protective groups". Virtually all the terminal or lateral carboxyl groups should be esterified with alcohols which are volatile under the stoving conditions. To prevent the polyester from migrating to the anode, it is important to ensure that it has an acid number below 20, preferably below 10 and more preferably below 3.

The reactivity of the esters is increased by a suitable chemical structure, for example by increasing the electrophilic activity of the carboxyl group or by a negative inductive effect on the alcohol group. Primary, secondary and tertiary carboxyl groups are suitable for tarnsesterification. Primary carboxyl groups are preferred for their greater reactivity.

The transesterification is promoted by the volatility of lower, linear or branched primary monoalcohols or by 1,2-glycols optionally substituted by ether or ester groups. The lower the molecular weight of the alcohols eliminated during the transesterification, the lower the associated losses. Methanol or ethanol are particlarly preferred. Numerous crosslinking agents containing ester groups used for transesterification with OH groups and/or for transamidation with $HN_2$ groups are described in the literature. For example, EP-A-0 004 090 describes polyurethane esters containing hydroxyalkylester groups, such as lactic acid esters, or aminoalkylester groups as tranesterifiable groups. The crosslinking agent has substantially the following general structure

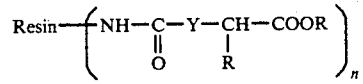

in which n has a value of at least 2 and preferably from 3 to 10, Y represents either —O— or —NH— and R represents a straight-chain or branched alkyl group containing from 1 to 8 carbon atoms and preferably 1 or 2 carbon atoms.

Another suitable crosslinking agent is a polyester containing carboxyl groups blocked by optionally substituted 1,2-glycols to form β-hydroxy compounds:

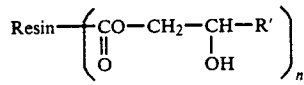

The 1,2-glycols used are best substituted by saturated or unsaturated alkyl, ether, ester or amide groups, i.e. R′ represents

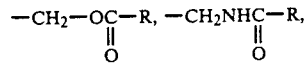

where n has a value of at least 2 and preferably from 3 to 10 and, resin is the residue of a carboxyl group containing polyeseter, R is a linear or branched alkyl group containing from 1 to 15 carbon atoms. Crosslinking agenst such as these are described in EP-A-0 012 463 and in DE-A-31 03 642, for example as the reaction product of trimellitic acid anhydride with Cardura E ®, the glycidyl ester of Versatic acid ®.

Other crosslinking agents are obtained by transesterification of dicarboxylic acid alkylesters with polyalcohols. Particularly high reactivity is shown by resins corresponding to the following general formula:

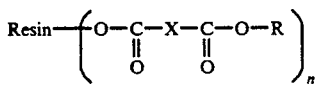

in which n has a value of at least 2 and preferably of from 3 to 10. X represents a —$CH_2$—, —$CH_2$—$CH_2$— or —$CH=CH$— group and R is a straight-chain or branched alkyl group containing from 1 to 8 and preferably 1 to 2 carbon atoms. In its most simple form, this crosslinking agent is a reaction product of trimethylol propane and malonic acid dimethylester, as described in EP-A-0 082 291.

Other crosslinking agents capable of transesterification are obtained by Michael addition of acetoacetic acid alkylester or malonic acid dialkylester with resins containing double bonds activated through CO groups:

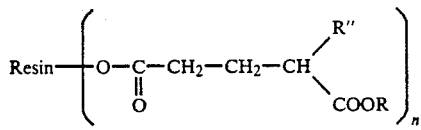

in which R″ represents —COOR, —CO—R or —CN and n has a value of at lest 2 and preferably from 3 to 10. In the most simple case, these resins are produced from butane diol diacrylate and acetoacetic ester or from the tolylene diisocyanate-hydroxyalkyl(meth)acrylate adduct and malonic acid dialkylester, as described in DE-A-33 15 469. The Michael addition may be carried out stoichiometrically or even using excess double bonds.

DE-A-33 22 766 describes crosslinking agents containing carbalkoxymethylester groups. Compounds of this type have substantially the following general formula:

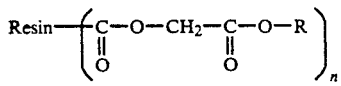

in which n has a value of at least 2 and R is an alkyl group.

The crosslinking of components (A) and (B) may optionally be accelerated by addition of strongly basic teritary amines and/or active metal compounds. A particular, occasionally synergistic effect is obtained by combination of the deposited amino base resin and the meal catalysts.

In general, the catalyst content required for catalyzing the transesterification process is higher than that required for the reaction of component (A) with the blocked polyiscyanates. The overall content of catalysts of the type in question amounts to between about 0.01 and 10% by weight, based on the total weight of components (A) and (B). The exact quantitative ratio may readily be determined by the expert taking the prior art into account. Quantitative ratios in the lower range are preferred for the reaction with polyisocyanates, whilst quantitative ratios in the upper range are preferred for the transesterification process. The catalysts used are preferably metal oxides, metal salts or metal complexes of monovalent or polyvalent metals. They are dissolved in aliphatic and aromatic hydrocarbons, in general after salt formation with, for example, 2-ethylhexanoic acid. These solutions are co-emulsified with the electrophoresis bath. Another possibility is to complex the metals with acetylacetonate, dicyclopentadiene, 8-oxyhydroquinoline, 4-methylcatechol and/or 2,5-dimercapto-1,3,4-thiadiazole.

Examples of suitable catalysts are antimony trioxide, tri-n-butyltin oxide, dibutyltin dilaurate, lead octoate, iron(III) acetylacetonate or the reaction product of zinc oxide and 8-oxyhydroquinoline. The reaction of the blocked polyisocyanates is preferably catalyzed with 0.01 to 2% by weight of dibutyltin dilaurate whilst the transesterification is preferably catalyzed with 2 to 8% by weight of lead octoate. The metal catalysts may also be co-dispersed in finely divided form as pigments, such as lead silicate. Water-dilutable metal salts are also suitable transesterification catalysts providing the metal is deposited with the lacquer in finely divided form either as a compound or as a complex. It is preferred to use catalysts which are poorly soluble in the ED bath and which, after electrophoretic deposition, are uniformly distributed throughout the deposited film on stoving.

Components (A) and (B) may be cold-mixed or even pre-condensed at elevated temperature. Components (A) and (B) react with one another to a certain extent without the mixture losing its thermosetting property or its ability to be solubilized in water by protonization with acids.

In order to balance out the performance properties, it is best if, in addition to the crosslinking agent, the cathodically depositable synthetic resin binder (A) additionally contains up to 30% by weight and preferably from 5 to 20% by weight of a hydroxyfunctional resin (component C) which reacts with the blocked polyisocyanates and the transesterifiable crosslinking agents. Thus, hydroxyfunctional resins having an OH number of from 30 to 500 and preferably from 50 to 300 and an average molecular weight ($\overline{Mn}$) of from 300 to 5000 and preferably from 500 to 3000 may be used to increase coverage. Examples of resins such as these are styreneallylalcohol copolymers, OH-group-containing (meth)acrylic copolymers, caprolactone polyols, caprolactam polyols, urethane polyols, polyethers and polyesters containing OH groups. Thus, copolymers containing OH groups are prepared by copolymerization of unsaturated monomers containing hydroxl groups with other ethylenically unsaturated monomers which do not contain any other reactive functional groups, as already described above. Polyether polyols are understood to be compounds corresponding to the following general formula

in which R=H or a lower alkyl group optionally substituted by various substituents, o=2 to 6 and p=5 to 50. Examples are polyoxytetramethylene glycols. Polyester polyols may be obtained by polycondensation of polycarboxylic acids or their anhydrides with organic polyalcohols or by reaction of an ε-lactone with polyalcohols. The polycarboxylic acids are normally aliphatic, cycloaliphatic or aromatic dicarboxylic acids whilst the polyalcohols are normally linear or branched aliphatic or cycloaliphatic polyols. Examples are branched polyesters or adipic acid, phthalic acid anydride, trimethylol propane and 1,4-butylene glycol or the reaction product of ε-caprolactone with trimethylol propane. Polyurethane polyols are obtained by reaction of aliphatic, cycloaliphatic or aromatic polysocyanates, preferably diisocyantes, with aliphatic or cycloaliphatic polyalcohols, polyether polyols and/or polyester polyols. The various hydroxyfunctional resins may also be used in the form of mixtures or may have a segmented structure. Examples are the reaction products of 2 moles of polyglycolether with 1 mole of polyester containing hydroxyl groups or 2 moles of polyglycolether with 2 moles of dicarboxylic acid and 1 mole of polyurethane containing hydroxyl groups.

The resins contain such a quantity of polar groups, preferably primary OH groups, that they are satisfactorily co-emulsified with the neutralized, basic synthetic resin binder (component A). To achieve better compatibility and dilutability with water, it is possible to incorporate a low amine number below 30 and preferably below 20. The resins are preferably synthesized in such a way that the components show very little tendency towards yellowing on stoving. The molecular weight range is selected in such a way that they are no longer volatile, but provide for good film formation through improved fluidity. Any precondensation step may be carried out in any order, i.e. either components (A) with (B) or (B) with (C) or (A) with (B) and (C).

The cationic synthetic resin binder (A) is made dilutable with water in known manner by protonization with acids such as, for example, formic acid, acetic acid, propionic acid, lactic acid, citric acid, malonic acid, acrylic acid, phosphoric acid or alkylphosphoric acid. Monobasic low molecular weight organic carboxylic acids are preferred. The acid has to be added in at least such a quantity that the cationic base resin is stably emulsified. An excess of acid, i.e. a degree of neutralization above 100%, should best avoided. The MEQ-value (milliequivalents of acid per 100 g of solid resin) is generally between 20 and 80. The MEQ value should be as low as possible in order to obtain as high a deposition equivalent as possible.

The coating composition may contain up to about 20% by weight of organic solvents to reduce viscosity, to control the deposition voltage and to improve adhesion and levelling. The organic solvent content should be as low as possible, preferably below 15% by weight and more preferably below 10% by weight. Suitable solvents are alcohols, glycolethers, ketoalcohols, optionally with addition of aliphatic and/or aromatic hydrocarbons of varying chain length. In selecting the solvent, it is important to bear in mind that the crosslinking agent is not soluble in water and that fractions of water-insoluble solvents may facilitate and stabilize the dispersion process. Coverage decreases with increasing solvent content whilst the thickness of the deposited film increases and overcoating can occur. Water-insoluble solvents can have a stronger effect in this respect than water-soluble solvents. The aprotic solvents, if any, required for production of the resins may optionally be distilled off and replaced by other solvents after production of the product.

According to the invention, the coating composition best has a solids content of from 5 to 54% by weight after dilution with water. Adjustment of the lacquer to a relatively high solids content of from 25 to 50% by weight and preferably from 30 to 45% by weight gives water-dilutabled stoving lacquers which may be applied to the object to be lacquered by immersion coating, spray coating, roll coating, etc. If, by contrast, the lacquer is adjusted to a solids content of from 5 to 30% by weight and preferably from 10 to 20% by weight, it is suitable for electrophoretic deposition. The bath is continuously stirred to maintain a uniform temperature at the surface of the cathode and to prevent the insoluble constituents of the dispersion, for example the pigments, from settling. The pH-value of the lacquer is generally between 4.0 to 7.5 and preferably between 5.0 to 6.5. If the pH-value is too low, the acid is likely to attack the iron of tanks, pipes and pumps. The electrophoretic deposition process is best carried out at the earliest 24 hours after preparation of the bath. In the meantime, the bate is best continousouly stirred to obtain uniform distribution. The anodes used are electrically conductive, non-corroding electrodes, for example of stainless steel or graphite. The object to be coated at the cathode and the anode is immersed in an aqueous bath, as known for electrophoretic deposition. It is possible to coat any metallically conductive workpieces, such as copper, aluminium, tin, zinc iron and alloys of these metals. The bath is best kept at temperatures of from about 15° to 35° C. during deposition. The solids content, deposition temperature and time and the voltage are best selected in such a way that the desired layer thickness is obtained after rinsing with water and/or ultrafiltrate and stoving at temperatures of from about 150° to 230° C. Thus, layer thickness for example increases with increasing coating time and deposition voltage. On the application of an electrical current with a voltage of best from 50 to 500 volts between the metallically conductive workpiece and a counterelectrode, the water-dilutable base resin is coagulated at the cathode, taking with it the water-insoluble crosslinking agent, pigments, catalysts, etc. As a result, the ratio of pigment to the synthetic resin binder in the deposited film may shift in favor of the pigment. At the same time, water and the acid used for neutralization undergo an increase in concentration in the bath. Accordingly, the bath has to be topped up with concentrated lacquers wich correct this shift through modified quantitative ratios. This correction may also be made by using suitable equipment, for example electrodialysis or ultrafiltration.

The concentrated binder to be diluted with water according to the invention having a solids content of from about 85 to 60% by weight may be pigmented in the usual way using a ball mill, a three-roll stand or a bead mill. Standard pigments, fillers, corrosion inhibitors and lacquer auxiliaries, such as anticrater agents, levelling agents or antifoam agents, may be used for this purpose. It is of courses important to select additives which do not enter into any troublesome reactions with water in the acidic to neutral medium, do not entrain any water-soluble foreign ions and, on ageing, are not precipitated in sush a way that they cannot be stired up again. The lacquers are particularly suitable for the electrodeposition lacquering of metals and, after stoving preferably for 15 to 45 minutes at 160° to 190° C., give smooth, glossy films characterized by high resistance to ageing, a uniform layer thickness, improved adhesion, greater hardness and elasticity and very high corrosion resistance. The pigment-to-binder ratio depends upon the dispersibility and viscosity of the binder and is generally in the range from 0.1:1 to 1.5:1. As the Comparison Tests show, the binders according to the invention surprisingly give off fewe decomposition products on stoving and yellow to a lesser extent that the combination containing the pure, unmixed crosslinking agents. It is possible in this way to develop aminoepoxy resin combinations which are more suitable for two-layer lacquers by virtue of the weaker change in color obtained on stoving.

Instead of the crosslinking agent mixture of (A) and (B) crosslinking agents may be used, which contain blocked polyisocyanate groups and ester groups capable of transesterification side by side, the ratio of blocked polyisocyante groups and ester groups capable of transesterification being in a range of from 1:20 to 20:1, preferably in a range of from 1:4 to 4:1, and most preferably in a range of from 1:2 to 2:1.

They may be prepared by partially blocking polyisocyanates and reacting the remaining isocyanate groups with compounds which contain groups capable of reacting with isocyanate groups and ester grous capable of transesterification. Further, compounds, which contain ester groups capable of transesterification as well as groups reacting with isocyanates, may be reacted with polyisocyanates in excess and the remaining free isocyanate groups may be blocked thereafter.

Synthetic resin binder A1

To a solution of 283.2 g of polyglycidylether based on bisphenol A and having an epoxy equivalent weight of 472 (Epikote 1001) in 161 g of ethylene glycol monobutylether added 21 g of diethanolamine, 10.2 g of 3-(N,N-dimethylamino)-propylamine and 61.6 g of an adduct of 116 g of 1,6-diaminohexane with 500 g of a glycidyl ester of versatic acid (Cardura E 10). The mixture of polyether and the amines reacts for 4 hours with stirring at temperatures of from 85° to 90° C. To complete the reaction, the mixture is then heated for 1 hour to 120° C. The epoxy content is then zero.

| | |
|---|---|
| Amine number: | 98 mg KOH/g solid resin |
| Solids content: | approx. 70% by weight. |

Synthetic resin binder A2

725 g of ethylene glycol monobutylether are heated under an inert gas to 110° C. using a reflux condenser. A mixture of 192 g of hydroxyethylacrylate, 137 g of butane diol monoacrylate, 228 g of glycidylmethacrylate, 364 g of 2-ethylhexylacrylate, 439 g of butylmethacrylate, 438 g of methylmethacrylate, 90 g of styrene and 44 g of azo-bis-isobutyronitrile is then added over a period of 3 hours. The temperature is then kept at 110° C. for 1 hour, after which 6 g of azo-bis-isobutyronitrile are added and this operation repeated after another hour. The following characteristics are measured after 3 hours at 110° C.:

| | |
|---|---|
| Solids content: | 72.2% by weight (after heating for 30 minutes to 150° C.) |
| Viscosity: | 2.14 Pas (after dilution to 60% by weight with ethylene glycol monobutylether at 25° C.). |

After cooling to 50° C., a mixture of 129 g of diethylamine and 201 g of isopropanol is quickly added (1.10 mole of amine to 1.00 equivalent of epoxide). After 30 minutes, the mixture is heated to 65° C. and kept at that temperature for 1 hour and then to 105° C. and kept at that temperature for 2 hours. After cooling to 80° C., isopropanol and excess amine are distilled off in vacuo and the amine residues are removed by distillation with steam. The solids content is adjusted to 78% by weight with ethylene glycol monobutylether.

| Final values: | |
|---|---|
| Solids content: | 78.7% by weight (30 mins/150° C.) |
| Amine number: | 45 mg KOH/g solid resin |
| Viscosity: | 3.44 Pas (after dilution to 60% by weight with ethylene glycol monobutylether at 25° C.). |

Crosslinking agent B1

1248 g of glycidyl ester of versatic acid (Cardura E) are heated to 100° C. in an inert gas atmosphere, after which 460.8 g of trimellitic acid anhydride are added in several portions with thorough stirring. Utilizing the heat of the exothermic reaction, the reaction mixture is heated to 195° C. When the resin is clear, the mixture is cooled to 145° C. and 1.8 ml of benzyldimethylamine is added as catalyst. After reaching an acid number of 2 mg KOH/g solid resin, the mixture is cooled to 100° C. and diluted with 712 g of ethylene glycol monobutylether.

| | |
|---|---|
| Solids content: | approx. 70% by weight (after heating for 40 minutes to 180° C.). |

Crosslinking agent B2

666 g of isophorone diisocyanate and 134 g of trimethylol propane are mixed with 431 g of anhydrous ethylene glycol acetate and heated with stirring for 1 hour to 60° C. in the absence of atmospheric moisture. The initially solid trimethylol propane melts and then reacts slowly over a period of 1 hour, the temperature being increased to 90° C. To complete the reaction, the temperature is kept at 90° C. for another 3 hours, after which an NCO equivalent weight of 410 is obtained. 366 g of e-caprolactam are then added so slowly over a period of 3 hours that the reaction temperature does not exceed 100° C. This temperature is maintained until the NCO content has fallen below 0.1%. The solvent is largely distilled off in vacuo and the solids content is adjusted to 80% by weight with ethylene glycol monobutylether.

Crosslinking agent B3

875 g of a reaction product of 1 mole of trimethylol propane with 3 moles of tolylene diisocyanate (Desmodur L) (75% solution in ethylacetate), is heated with thorough stirring to 90° C. in the absence of moisture while a dry inert gas is passed over. 342 g of e-caprolactam are added so slowly over a period of 3 hours that the reaction temperature does not exceed 100° C. This temperature is maintained until the NCO content has fallen below 0.1%. The solvent is largely distilled off in vacuo and the solids content is adjusted to 80% by weight with ethylene glycol monobutylether.

EXAMPLE 1

201 g of synthetic resin binder A1, 123 g of titanium dioxide pigment (rutile) and, depending on the crosslinker, 0.2% of dibutyltin dilaurate (for blocked isocyanates) or 2% of lead octoate (for polyesters) or mixtures thereof are ground in a bead mill for 35 minutes at a temperature below 55° C. The crosslinker resins are then added in the mixtures indicated in the following Table and mixed in a dissolver with 12 g of formic acid (50%), followed by dilution with stirring to 2 liters using fully desalted water.

TABLE 1

| Test No. | Synthetic resin binder | Crosslinking agent blocked isocyanate | polyester |
|---|---|---|---|
| 1 | 201 g A1 | 44 g B3 | — |
| 2 | 201 g A1 | 33 g B3 | 12.6 g B1 |
| 3 | 201 g A1 | 11 g B2 | 25.2 g B1 |
| 4 | 201 g A1 | — | 50.4 g B1 |

Accordingly, tests 1 and 4 correspond to the prior art, because the crosslinker used in test 1 is only a blocked polyisocyanate and the crosslinker used in test 4 only a polyester. Tests 2 and 3 correspond to the invention.

The electrophoretic depositions were made on zinc-phosphated sheets at a bath temperature of 28° C. Coating is carried out for 2 minutes at a voltage selected in such a way as to give a layer thickness of from 17 to 18 μm. The stoving temperature is 180° C. (25 minutes). The test results are set out in Tables 2 and 3. In the Tables, the parts by weight used are shown only for the blocked isocyanate and the polyester. They are both used in admixture with 80 parts by weight of synthetic resin binder A1.

EXAMPLE 2 206.5 g of synthetic resin binder A2, 106.5 g of a rutile pigment, 6.4 g of lead salt of 2ethylhexanoic acid (72%) Octa-Soligen), 0.4 g of dibutyltin dilaurate and 54.8 g of ethylene glycol monobutylether are ground in a bead mill for 35 minutes at temperatures below 55° C. Thereafter 24.2 g of crosslinking agent B1 and 29.8 g of crosslinking agent B2 are added and mixed in a dissolver, 10.5 g of formic acid (50%) gradually being added. Dilute carefully with thorough stirring to 2 liters using fully deionized water.

| Bath values: | |
|---|---|
| Solids content: | 14.2% by weight (25 mins./180° C.) |
| pH value: | 5.2 |
| MEQ value: | 51 |
| Bath conductivity: | 1730 μScm$^{-1}$ |

Zinc-phosphated steel plates (Bonder 132) are coated for 2 minutes at a bath temperature of 28° C., voltage 150 volts. After rinsing with water and stoving for 25 minutes at 180° C., a dry film thickness of 17 μm is obtained. A smooth, white film having a satisfactory surface which does not yellow in the event of overstoving (30 minutes at 200° C.) is formed. After standing for several weeks, the bath still readily gives a film having the same surface quality.

TABLE 2

| | Test 1 | Test 2 |
|---|---|---|
| Blocked isocyanate B3 | 20 parts by weight | 15 parts by weight |
| Polyester B1 | 0 part by weight | 5 parts by weight |
| Bath values: | | |
| pH-value | 5.0 | 5.02 |
| Bath conductivity (μScm$^{-1}$) | 1670 | 1700 |
| MEQ value | 53.8 | 53.6 |
| Solids content (30 mins./180° C.) | 12.5 | 12.9 |
| Film properties: | | |
| Stoving loss (30 mins./190° C.) | 12.3% by weight | 11.3% by weight |
| Color change (ΔE) | 19.4 | 10.3 |
| Crosslinking (MIBK Rub test) | i.O. | i.O. |
| Koenig pendulum hardness (DIN 53157) | 176″ | 182″ |
| Erichsen indentation (mm) (DIN 53156) | 4.9 mm | 5.5 mm |
| Crosshatching (DIN 53151) | 0–1 | 0 |
| Gloss (Gardner, 60°) | 80 | 83 |
| Change in blue in Bauknecht alternating test | 2–3 | 1–2 |

TABLE 3

| | Test 3 | Test 4 |
|---|---|---|
| Blocked isocyanate B2 | 5 parts by weight | 0 part by weight |
| Polyester B1 | 15 parts by weight | 20 parts by weight |
| Bath values: | | |
| pH-value | 5.3 | 5.0 |
| Bath conductivity (μScm$^{-1}$) | 1710 | 1620 |
| MEQ value | 52.2 | 56.0 |
| Solids content | 13.3% by weight | 11.6% by weight |
| Film properties: | | |
| Stoving loss (25 mins./180° C.) | 8.8% by weight | 10% by weight |
| Color change (ΔE) | 10.2 | 14 |
| Crosslinking (MIBK Rub test) | i.O. | i.O. |
| Koenig pendulum hardness (DIN 53157) | 162″ | 158″ |
| Erichsen indentation (mm) (DIN 53156) | 6.3 mm | 5.1 mm |
| Crosshatching (DIN 53151) | 0–1 | 1 |
| Gloss (Gardner 60°) | 61 | 53 |
| Change in blue in Bauknecht alternating test | 1 | 1–2 |

We claim:
1. An aqueous electrodeposition lacquer coating composition comprising an organic synthetic resin binder dilutable in water by protonization with acids, said binder consisting essentially of
   (A) from 95 to 505 by weight, based on the total quantity of binder, of an organic externally crosslinkable synthetic resin containing tertiary amino groups, primary and/or secondary hydroxyl groups and having a hydroxyl number of from 50 to 500, an amine number of from 30 to 150, and an average molecular weight (Mn) of from about 250 to about 10,000 and
   (B) from 5 to 50% by weight of a crosslinking mixture of
      (a) polyisocyanates blocked with protective groups which are split off at baking temperatures below 210° C. and above 110° C.;

(b) transesterifiable crosslinking agents containing at least two ester groups per molecule which are substantially stable in neutral, aqueous medium, but which form an ester with the hydroxyl groups of component (A) in basic medium at temperatures above 140° C., said transesterifiable crosslinking agent being a polyester of the following formula

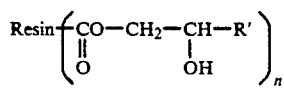

wherein
R' is —H, —R, —CH$_2$OH, —CH$_2$—O—R,

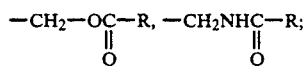

n is at least 2;
R is a linear or branched C$_{1-15}$ alkyl residue;

resin is a residue of a carboxyl group containing polyester, and
the components (A) and (B) being present in a ratio of from b 1:20 to 20:1 parts by weight.

2. A coating composition as claimed in claim 1, characterized in that the mixing ratio of (a) to (b) is from 1:4 to 4:1 by weight.

3. A coating composition as claimed in claim 1, characterized in that the mixing ratio of (a) to (b) is from 1:2 to 2:1 by weight.

4. A coating composition as claimed in claim 1, characterized in that component (A) comprises aminopoly acrylate or aminopolymethacrylate resins.

5. The lacquer according to claim 1, further comprising up to 30% by weight, based on the total weight of components (A) and (B), of hydroxyfunctional resins having an OH number of from 30 to 500 and an average molecular weight (Mn) of from 300 to 5000 and being devoid of amino groups.

6. The aqueous lacquer of claim 1, further comprising pigments, fillers, corrosion inhibitors, and, in a quantity of up to 20% by weight, based on the total weight of the coating composition, organic solvents.

* * * * *